United States Patent
Wu et al.

(10) Patent No.: US 9,569,993 B2
(45) Date of Patent: Feb. 14, 2017

(54) PIXEL ARRAY COMPRISING SELECTION LINES

(71) Applicant: E Ink Holdings Inc., Hsinchu (TW)

(72) Inventors: Chi-Ming Wu, Hsinchu (TW);
Shu-Ping Yan, Hsinchu (TW);
Shu-Hao Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 14/489,475

(22) Filed: Sep. 18, 2014

(65) Prior Publication Data

US 2015/0206470 A1  Jul. 23, 2015

(30) Foreign Application Priority Data

Jan. 23, 2014 (TW) .............................. 103102461 A (51) Int. Cl.
*G09G 3/30* (2006.01)
*G09G 3/20* (2006.01)
*G02F 1/1362* (2006.01)

(52) U.S. Cl.
CPC ........... *G09G 3/20* (2013.01); *G02F 1/136286* (2013.01); *G09G 2300/0413* (2013.01); *G09G 2300/0426* (2013.01); *G09G 2310/0218* (2013.01); *G09G 2320/0233* (2013.01)

(58) Field of Classification Search
CPC ............... G09G 2300/0426; G09G 2320/0233; G09G 2300/0413; G02F 1/133
USPC ........................................... 345/103; 349/143
See application file for complete search history.

(56) References Cited

U.S. PATENT DOCUMENTS

| 2006/0181498 A1* | 8/2006 | Toyozawa ............ G09G 3/3655 345/98 |
| 2009/0066623 A1 | 3/2009 | Ma et al. |
| 2010/0066967 A1* | 3/2010 | Takahashi ......... G02F 1/136286 349/143 |

(Continued)

FOREIGN PATENT DOCUMENTS

| CN | 1739136 | 2/2006 |
| CN | 102298915 | 12/2011 |

(Continued)

OTHER PUBLICATIONS

"Office Action of Taiwan Counterpart Application", issued on Nov. 9,2016, p1-p5, in which the listed references were cited.

(Continued)

*Primary Examiner* — Jonathan Blancha
(74) *Attorney, Agent, or Firm* — Jianq Chyun IP Office (57) ABSTRACT

A pixel array including first and second signal lines, an active device, a pixel electrode and selection lines is provided. The second signal lines are intersected with the first signal lines to drive the active device, and the pixel electrode is connected to the active device. The selection lines are electrically insulated to the second signal lines and intersected with the first signal lines, where at least one selective line is disposed between the adjacent two second signal lines. An amount ratio of the first signal lines and the selection lines is a1/a2, where a1≤a2, and when a1 and a2 are mutually prime numbers, the selection lines are divided into a plurality of groups, and each group includes a1 selection lines electrically connected to the first signal lines, and (a2−a1) selection lines not electrically connected to the first signal lines.

12 Claims, 8 Drawing Sheets

(56) References Cited

U.S. PATENT DOCUMENTS

2012/0306350 A1    12/2012  Zeng et al.
2013/0181605 A1*   7/2013   Chang .................... H05B 37/00
                                                      315/32

FOREIGN PATENT DOCUMENTS

| CN | 102623451  | 8/2012  |
| CN | 103208248  | 7/2013  |
| JP | 2005354567 | 12/2005 |
| JP | 2013140366 | 7/2013  |
| TW | 200848865  | 12/2008 |
| TW | 200916923  | 4/2009  |
| TW | 423230     | 1/2014  |

OTHER PUBLICATIONS

"Office Action of China Counterpart Application", issued on Dec. 2, 2016, p1-p9, in which the listed references were cited.

* cited by examiner

PIXEL ARRAY COMPRISING SELECTION LINES

CROSS-REFERENCE TO RELATED APPLICATION

This application claims the priority benefit of Taiwan application serial no. 103102461, filed on Jan. 23, 2014. The entirety of the above-mentioned patent application is hereby incorporated by reference herein and made a part of this specification.

BACKGROUND

Technical Field

The invention relates to a pixel array. Particularly, the invention relates to a pixel array adapted to a slim border design.

Related Art

In recent years, along with development of technology industry, electronic apparatuses such as mobile phones, tablet computers or ebooks have been widely applied in people's daily life. As the electronic apparatuses are more and more popularised and developed towards a trend of convenience and multifunction, when consumers select and purchase the electronic apparatuses, a display device with a slim border becomes a main consideration factor in purchase besides software and hardware functions of the electronic apparatus.

Figure 1:
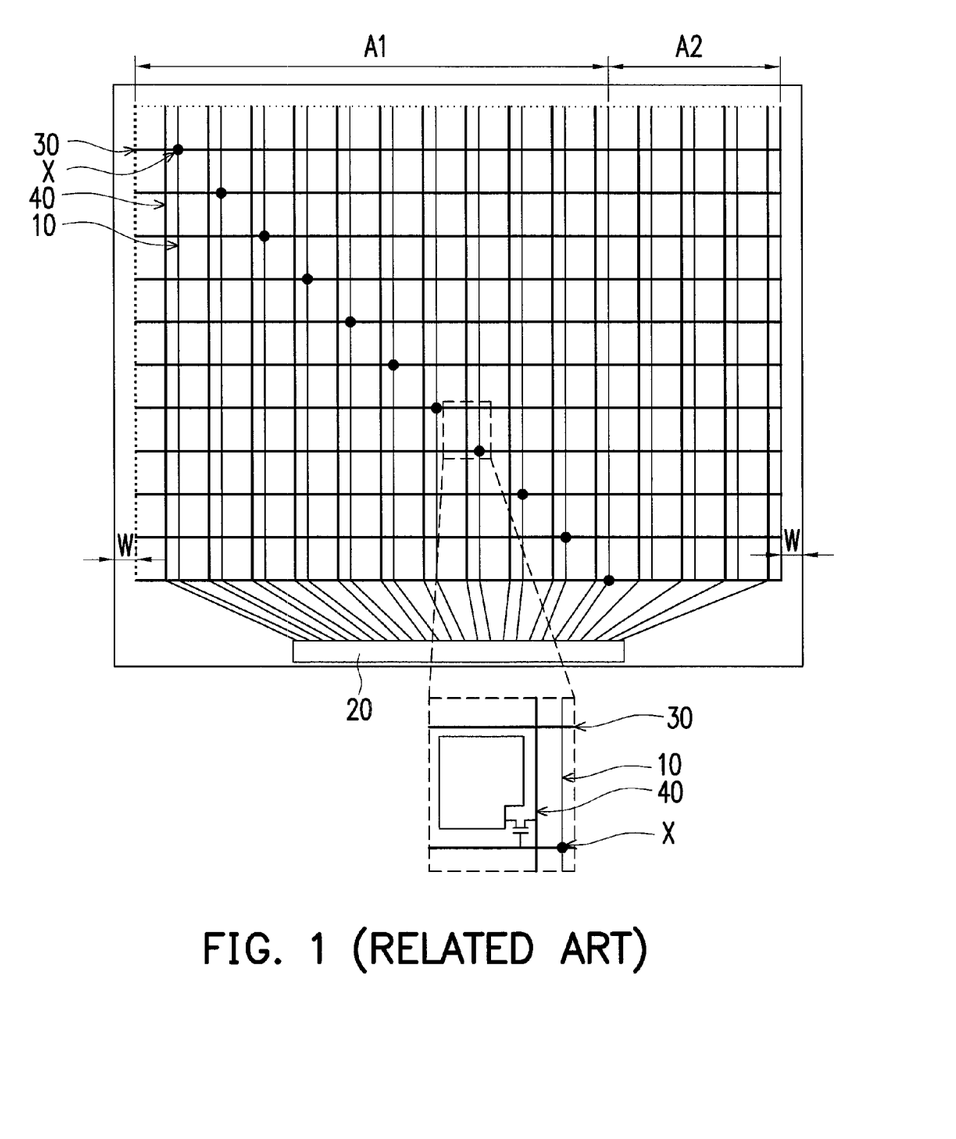
FIG. 1 is a top view of a conventional display apparatus.

Generally, as a screen is developed towards a trend of lightweight and a profile thereof is developed to have a maximum display region, a non-display region used for shielding connection lines at periphery of the screen is reduced to enlarge the display region of the screen, so as to cope with the design requirement of slim border. As shown in FIG. 1, a method for narrowing a frame border is developed in recent years, by which selection lines 10 are configured besides scan lines 30 and data lines 40, where the selection lines 10 are electrically connected to the corresponding scan lines 30 through bridge points X. In this way, a chip 20 can transmit scan signals to the corresponding scan lines 30 through the selection lines 10. According to such layout design, since both of the scan lines 30 and the data lines 40 are wired to the chip 20 from a same side of the display region, a width W of the non-display region along a horizontal direction is narrowed, so as to cope with the design requirement of slim border. However, along with increase of resolution, a signal coupling effect of the selection lines 10 becomes more obvious. When the selection lines 10 transmit signals, voltages of pixels located beside the selection lines 10 are liable to be influenced to cause a gray level difference between a region A1 with relatively denser bridge points X and a region A2 with relatively sparser bridge points X, so that display quality is influenced.

SUMMARY

The invention is directed to a pixel array, which is capable of ameliorating obviousness of gray level difference.

The invention provides a pixel array including a plurality of first signal lines, a plurality of second signal lines, a plurality of active devices, a plurality of pixel electrodes and a plurality of selection lines. The second signal lines are electrically insulated to the first signal lines, and are intersected with the first signal lines to define a plurality of pixel regions. The active devices are located in the pixel regions, and each of the active devices is electrically connected to the corresponding first signal line and the second signal line. The pixel electrodes are disposed corresponding to the pixel regions, and are electrically connected to the active devices. The selection lines are electrically insulated to the second signal lines, and are intersected with the first signal lines, where at least one selection line is disposed between the two neighbouring second signal lines. An amount ratio of the first signal lines and the selection lines is a1/a2, where a1≤a2, and when a1 and a2 are mutually prime numbers, the selection lines are divided into a plurality of groups, and each group includes a1 selection lines electrically connected to the first signal lines, and (a2−a1) selection lines not electrically connected to the first signal lines.

In an embodiment of the invention, each group includes a plurality of first selection lines electrically connected to the first signal lines and at least one second selection line not electrically connected to the first signal lines.

In an embodiment of the invention, an arranging sequence of the first selection lines and the at least one second selection line of each group is the same.

In an embodiment of the invention, in each of the groups, the at least one second selection line is located at one side of the first selection lines.

In an embodiment of the invention, in each of the groups, the at least one second selection line is located between the first selection lines.

In an embodiment of the invention, the number of the at least one second selection lines is plural, and at least a part of the second selection lines are dispersedly disposed between the first selection lines.

In an embodiment of the invention, when the number of the first signal lines is smaller than or equal to the number of the second signal lines, the number of the selection lines is equal to the number of the second signal lines, and the second signal lines and the selection lines are arranged in alternation along an extending direction of each of the first signal lines.

In an embodiment of the invention, when the number of the first signal lines is greater than the number of the second signal lines, the number of the selection lines is twice of the number of the second signal lines.

In an embodiment of the invention, the selection lines are located at two opposite sides of each of the pixel regions, and two selection lines are disposed between two neighbouring second signal lines.

In an embodiment of the invention, the two selection lines disposed between the two neighbouring second signal lines are further located between two neighbouring pixel electrodes.

In an embodiment of the invention, the selection lines and the pixel electrodes are not overlapped with each other.

In an embodiment of the invention, the selection lines and the second signal lines are located in a same layer, and the section lines and the first signal lines are located in different layers.

In an embodiment of the invention, the pixel array further includes a plurality of pads and a ground electrode. The pads are located at one side of the pixel regions. The ground electrode is located to at least one side of the pixel regions, and the selection lines electrically connected to the first signal lines are respectively connected between the ground electrode and one of the pads, and the selection lines not electrically connected to the first signal lines are respectively connected to the ground electrode.

In an embodiment of the invention, the pixel array further includes a plurality of first common electrodes, a plurality of common electrode connection lines and at least one second common electrode. The first common electrodes are electrically insulated to the pixel electrodes, and are disposed corresponding to the pixel electrodes. The common electrode connection lines connect the first common electrodes in series along a direction. The second common electrode is located to at least one side of the pixel regions, and the first common electrodes are electrically connected to the second common electrode through the common electrode connection lines, and the selection lines not electrically connected to the first signal lines are respectively connected between the second common electrode and the ground electrode.

According to the above descriptions, in the pixel array of the invention, the first selection lines electrically connected to the first signal lines and the second selection lines not electrically connected to the first signal lines are dispersedly disposed in the pixel array to decrease obviousness of gray level difference between different regions, so that display quality of a display apparatus using the pixel array of the invention is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 2A:
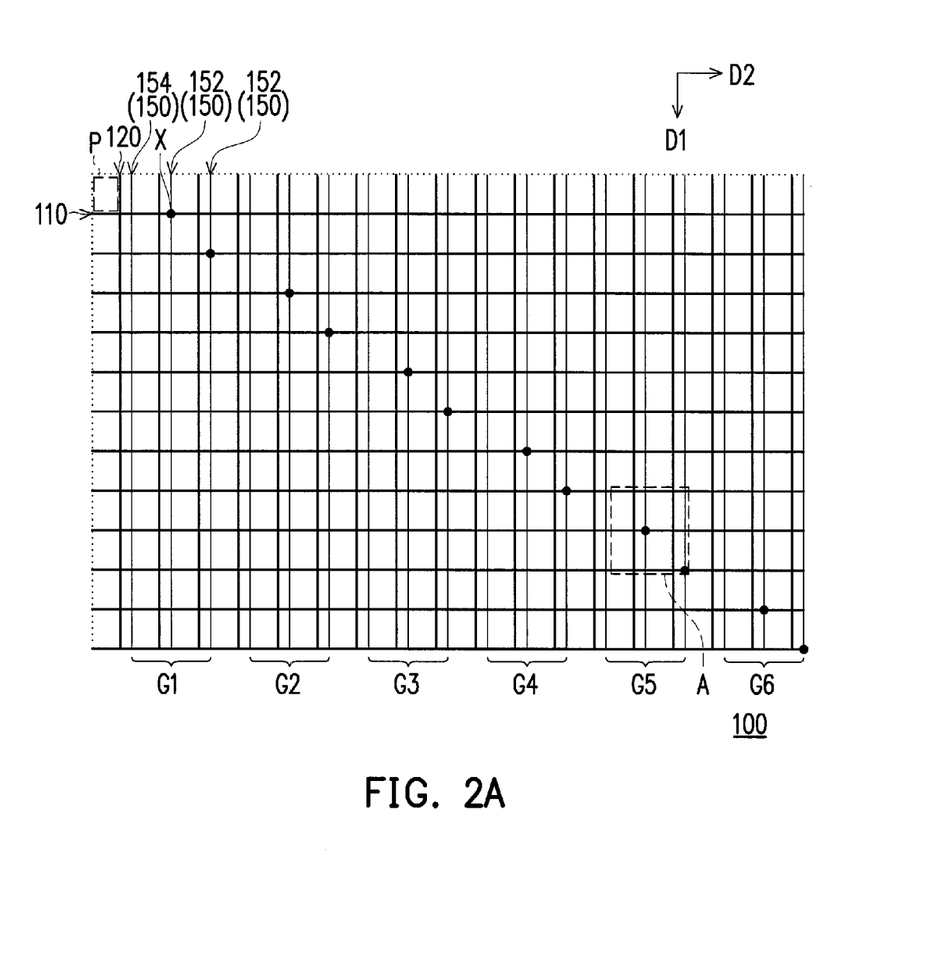
FIG. 2A is a top view of a pixel array according to a first embodiment of the invention.
Figure 2B:
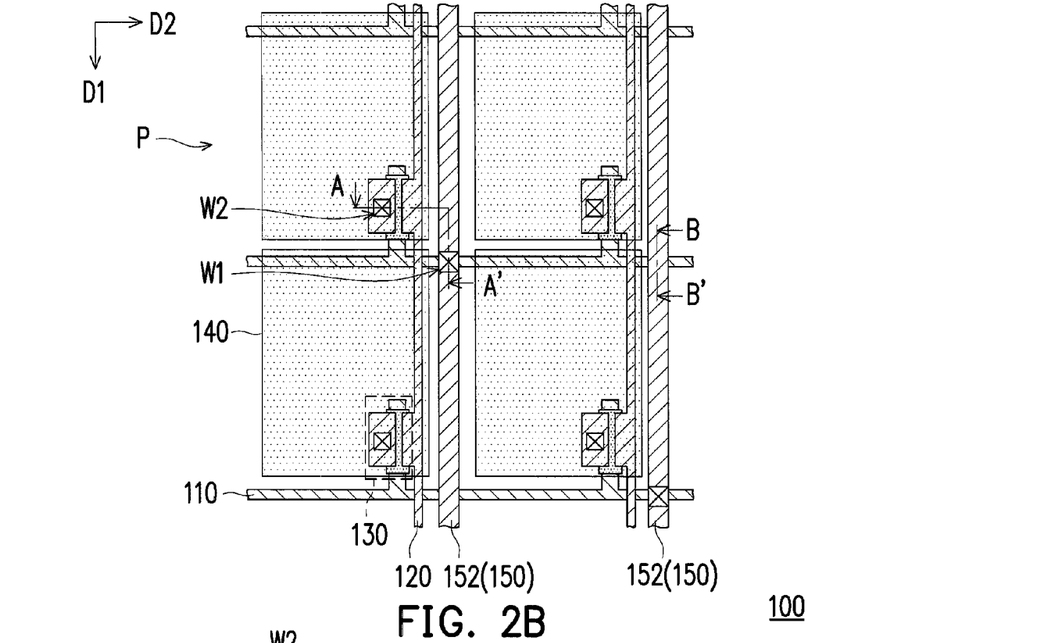
FIG. 2B is an enlarged view of a region A in FIG. 2A.
Figure 2C:
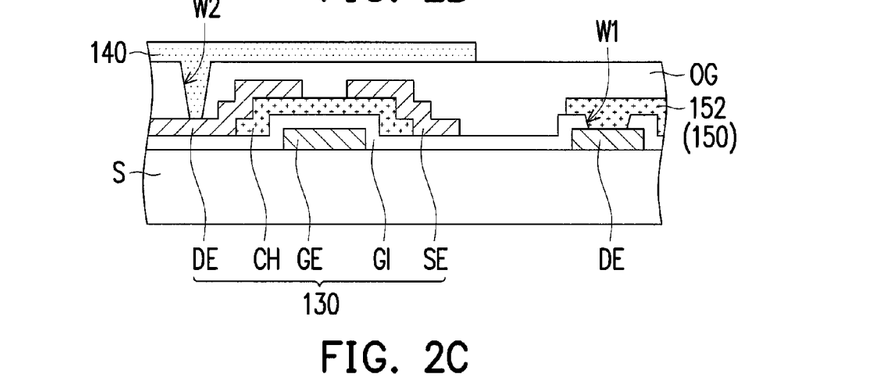
FIG. 2C and FIG. 2D are respectively cross-sectional views of FIG. 2B viewing along section lines A-A' and B-B'.
Figure 2D:
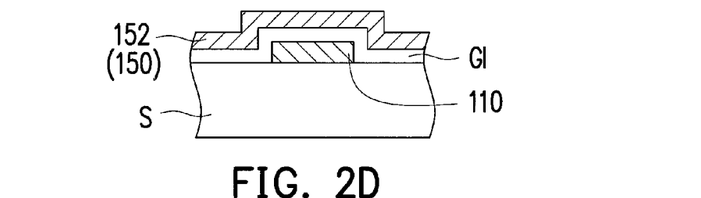

FIG. 2A is a top view of a pixel array according to a first embodiment of the invention. FIG. 2B is an enlarged view of a region A in FIG. 2A. FIG. 2C and FIG. 2D are respectively cross-sectional views of FIG. 2B viewing along section lines A-A' and B-B'. Referring to FIG. 2A to FIG. 2D, the pixel array 100 of the present embodiment includes a plurality of first signal lines 110, a plurality of second signal lines 120, a plurality of active devices 130, a plurality of pixel electrodes 140 and a plurality of selection lines 150.

The second signal lines 120 are electrically insulated to the first signal lines 110, and are intersected with the first signal lines 110 to define a plurality of pixel regions P. In detail, the first signal lines 110 of the present embodiment are arranged along a first direction D1 and respectively extend along a second direction D2. On the other hand, the second signal lines 120 are arranged along the second direction D2 and respectively extend along the first direction D1. The first direction D1 is intersected with the second direction D2, and the first direction D1 is, for example, perpendicular to the second direction D2, though the invention is not limited thereto.

The active devices 130 are located in the pixel regions P, and each of the active devices 130 is electrically connected to the corresponding first signal line 110 and the second signal line 120. In the present embodiment, each of the pixel regions P is configured with one active device 130, though the invention is not limited thereto, and in another embodiment, each of the pixel regions P can also be configured with a plurality of active devices 130.

The active devices 130 are, for example, disposed on a substrate S, and each of the active devices 130 includes a gate GE, a gate insulation layer GI, a channel layer CH, a source SE and a drain. DE. In the present embodiment, the gate GE and the first signal line 110 are disposed on the substrate S, and the first signal line 110 is electrically connected to the gate GE. The gate insulation layer GI covers the gate GE and the first signal line 110, and the gate insulation layer GI has a plurality of openings W1. The openings W1 exposes a part of the first signal line 110. The channel layer CH is disposed on the gate insulation layer GI, and is located above the gate GE. The source SE and the drain DE are disposed on the channel layer CH, and are respectively located at two opposite sides of the channel layer CH. The source SE is electrically connected to the second signal line 120.

In the present embodiment, although a bottom gate thin film transistor is used to implement the active device 130, the invention is not limited thereto. In another embodiment, types of the active devices 130 or the laminated structures thereof can be varied according to different design requirements. Moreover, types of signals transmitted by the first signal lines 110 and the second signal lines 120 are not limited by the invention. In the present embodiment, the first signal line 110 is electrically connected to the gate GE, and the second signal line 120 is electrically connected to the source SE, so that the first signal lines 110 are used for transmitting scan signals, and the second signal lines 120 are used for transmitting data signals. In another embodiment, if the second signal line 120 is electrically connected to the gate GE, and the first signal line 110 is electrically connected to the source SE, the second signal lines 120 are used for transmitting the data signals, and the first signal lines 110 are used for transmitting the scan signals.

Moreover, the pixel array 100 of the present embodiment may further include an insulation layer OG to protect the aforementioned devices, where the insulation layer OG covers the active device 130, the selection lines 150 and the gate insulation layer GI. Moreover, the insulation layer OG has a plurality of openings W2, and the openings W2 expose a part of the drain DE. The pixel electrodes 140 are disposed corresponding to the pixel regions P, and are electrically connected to the active devices 130. In detail, the pixel electrode 140, for example, contacts the drain DE through the opening W2. In the present embodiment, the pixel electrodes 140 further cover a part of the first signal lines 110 and the second signal lines 120, and the selection lines 150 are not overlapped with the pixel electrodes 140, though the invention is not limited thereto.

The selection lines 150 are electrically insulated to the second signal lines 120, and are intersected with the first signal lines 110, where each of the selection lines 150 contacts the corresponding first signal line 110 through one of the openings W1 of the gate insulation layer GI, so as to transmit a signal come from a chip side to the corresponding first signal line 110. In detail, each of the selection lines 150 is disposed adjacent to one of the second signal lines 120, and the selection lines 150 are, for example, arranged along the second direction D2 and respectively extend along the first direction D1. By configuring the selection lines 150, both of the first signal lines 110 and the second signal lines 120 can be wired to the chip side from a same side of the display region for connecting a chip (not shown), which avails narrowing a width of the non-display region, so that the display apparatus using the pixel array 100 of the present embodiment copes with the design requirement of slim border.

In the present embodiment, the selection lines 150 and the second signal lines 120 are located in a same layer, and the selection lines 150 and the first signal lines 110 are located in different layers. In detail, the gates GE and the first signal lines 110 can be formed by patterning a first metal layer, and the second signal lines 120, the selection lines 150, the sources SE and the drains DE can be formed by patterning a second metal layer, though the invention is not limited thereto. In another embodiment, the first signal lines 110, the sources SE and the drains DE can be formed by patterning the first metal layer, and the gates GE, the second signal lines 120 and the selection lines 150 can be formed by patterning the second metal layer. Then, the first signal lines 110 and the sources SE are electrically connected to transmit data signals, and the second signal lines 120 and the gates GE are electrically connected to transmit scan signals, and the selection lines 150 and the first signal lines 110 are electrically connected to transmit the data signals. It should be noticed that the first metal layer and the second metal layer are only used distinguish film layers formed through different fabrication processes, and are not used to limit a formation sequence of the metal layers. In an actual fabrication process, the first metal layer can be fabricated before or after the second metal layer is fabricated.

Under the structure of the invention, the number of the selection lines 150 and a configuration pattern thereof can be different along with an amount relationship between the first signal lines 110 and the second signal lines 120. However, at least one selection line 150 is disposed between two neighbouring second signal lines 120. For example, as shown in FIG. 2A, when the number of the first signal lines 110 is smaller than or equal to the number of the second signal lines 120, the number of the selection lines 150 is equal to the number of the second signal lines 120, and the second signal lines 120 and the selection lines 150 are arranged in alternation along an extending direction (i.e. the second direction D2) of each of the first signal lines 110.

Since each of the first signal lines 110 is only required to be electrically connected to one selection line 150, in case that the number of the selection lines 150 is greater than the number of the first selection lines 110, a part of the selection lines 150 are electrically connected to the first signal lines 110 (referring to the bridge points X), and a part of the selection lines 150 are not electrically connected to the first signal lines 110. To facilitate description, the selection lines 150 electrically connected to the first signal lines 110 are referred to as first selection lines 152, and the selection lines 150 not electrically connected to the first signal lines 110 are referred to as second selection lines 154.

In order to ameliorate a phenomenon of gray level difference produced between a region with relatively denser bridge points X and a region with relatively sparser bridge points X, the selection lines 150 are divided into a plurality of groups according to the greatest common divisor of the numbers of the first signal lines 110 and the selection lines 150. Moreover, the numbers of the first selection lines 152 and the second selection lines 154 in each group are adjusted according to an amount ratio of the first signal lines 110 and the selection lines 150. By dispersedly configuring the second selection lines 154 to each group, the phenomenon of obvious gray level difference caused by configuring the second selection lines 154 in centralization is mitigated.

In detail, the greatest common divisor of the number of the first signal lines 110 and the number of the selection lines 150 is N, where N is a positive integer greater than 1. The amount ratio of the first signal lines 110 and the selection lines 150 is a1/a2, where a1≤a2, and when a1 and a2 are mutually prime numbers, the selection lines 150 are divided into N groups, and each group includes a2 selection lines 150, where a1 selection lines 150 in the a2 selection lines 150 of each group are electrically connected to the first signal lines 110, and the other selection lines 150 in the a2 selection lines 150 of each group are not electrically connected to the first signal line 110. In other words, each group includes a1 first selection lines 152 and (a2−a1) second selection lines 154. When a1=a2, all of the selection lines 150 are electrically connected to the corresponding first signal lines 110. In this case, the selection lines 150 are all the first selection lines 152. On the other hand, when a1>a2, the selection lines 150 of each group may include a plurality of the first selection lines 152 and at least one second selection line 154.

As shown in FIG. 2A, the number of the first signal lines 110 (horizontal thick lines) is 12, and the number of the second signal lines 120 (vertical thick lines) is 18. Since the number of the first signal lines 110 is smaller than the number of the second signal lines 120, the number of the selection lines 150 (vertical thin lines) is designed to be equal to the number of the second signal lines 120, i.e. the number of the selection lines 150 is 18. Since the greatest common divisor (N) of the number of the first signal lines 110 and the number of the selection lines 150 is 6, the selection lines 150 are divided into 6 groups G1, G2, G3, G4, G5 and G6. Moreover, the amount ratio between the first signal lines 110 and the selection lines 150 is 2:3, so that each of the groups G1, G2, G3, G4, G5 and G6 includes two first selection lines 152 electrically connected to the first signal lines 110 and one second selection line 154 not electrically connected to the first signal line 110.

In the present embodiment, an arranging sequence of the first selection lines 152 and the at least one second selection line 154 in each of the groups G1, G2, G3, G4, G5 and G6 is the same. In detail, in each of the groups G1, G2, G3, G4, G5 and G6, the second selection line 154 is located at one side of the first selection lines 152, though the invention is not limited thereto. In another embodiment, the second selection line 154 can also be located between the first selection lines 152. In other embodiments, the arranging sequence of the first selection lines 152 and the at least one second selection line 154 in each of the groups G1, G2, G3, G4, G5 and G6 can be different, and as long as the second selection lines 154 between each of the groups G1, G2, G3, G4, G5 and G6 are not arranged in centralization to cause obvious gray level difference, it is considered to be within the scope of the invention.

Particularly, when the difference between a2 and a1 is large (for example, a2−a1≥5), and the number of the second selection lines 154 in each group is plural, at least a part of the second selection lines 154 in each group can be dispersedly disposed between the first selection lines 152 to further decrease obviousness of the gray level difference of each group. For example, when a1/a2=9/16, the first selection lines 152 in each group can be divided into a plurality of sub groups, and the second selection lines 154 in each group are dispersedly disposed between each of the sub groups and/or at least one side of all of the sub groups. For example, 9 first selection lines 152 in each group is divided into 3 sub groups, and one to three second selection lines 154 are disposed between each of the sub group (any three first selection lines 152) and/or disposed at one side of all of the sub groups to dispersedly dispose the second selection lines 154. In this way, the obviousness of the gray level difference between different regions is mitigated to improve display quality of the display apparatus using the pixel array 100.

Figure 3A:
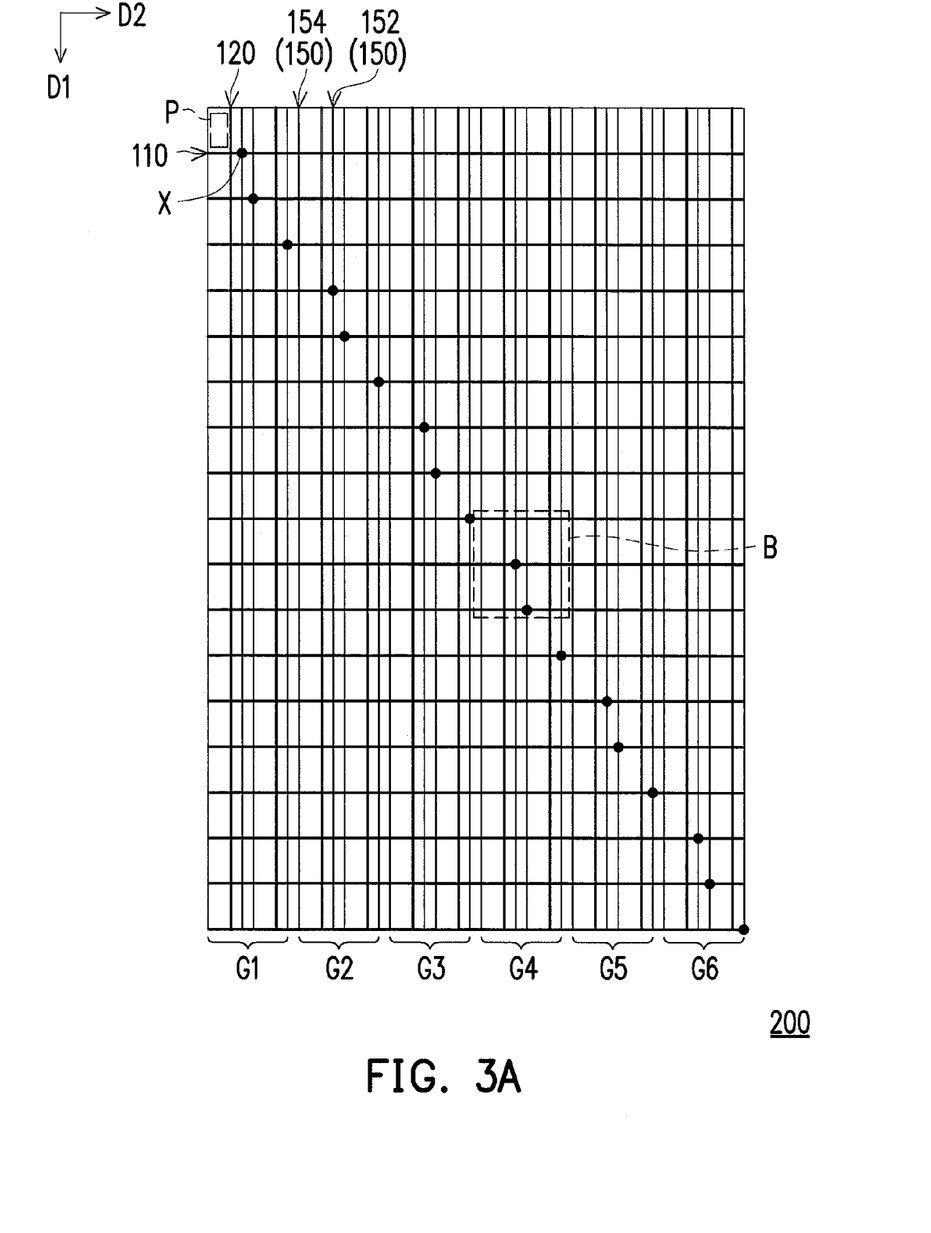
FIG. 3A is a top view of a pixel array according to a second embodiment of the invention.
Figure 3B:
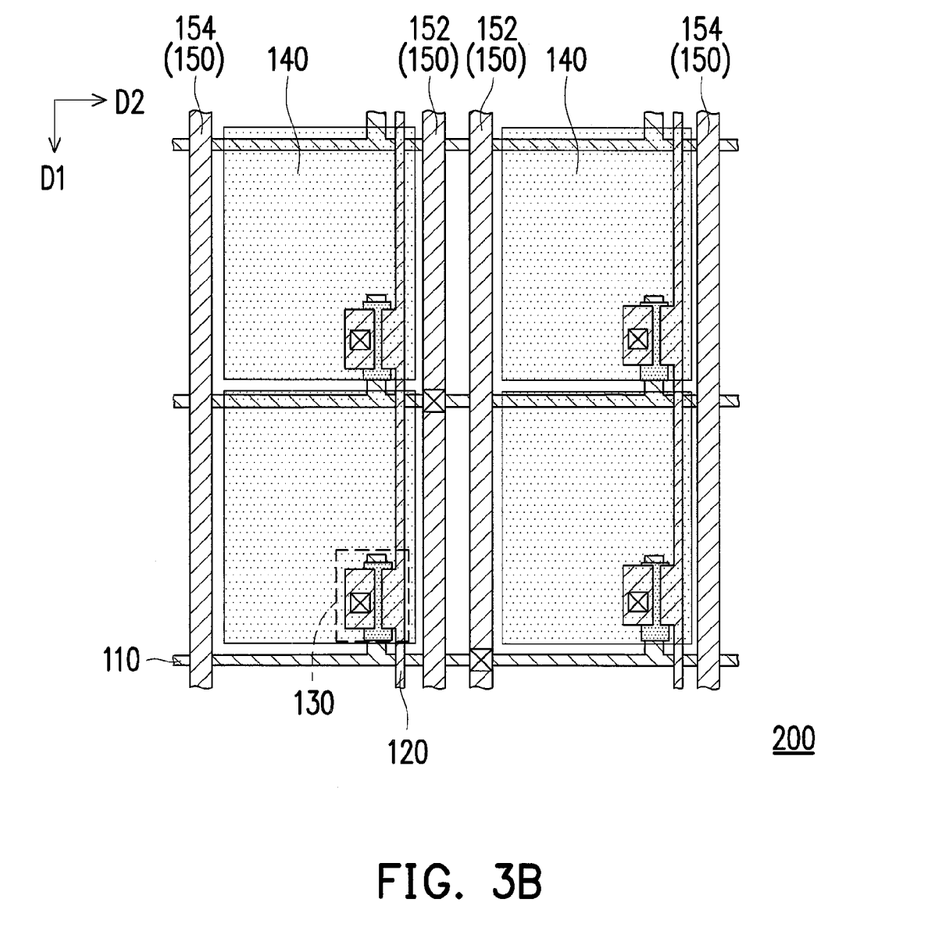
FIG. 3B is an enlarged view of a region B in FIG. 3A.

FIG. 3A is a top view of a pixel array according to a second embodiment of the invention. FIG. 3B is an enlarged view of a region B in FIG. 3A. Referring to FIG. 3A and FIG. 3B, the pixel array 200 of the present embodiment is similar to the pixel array 100 of FIG. 2A to FIG. 2D, where the same components are denoted by the same referential numbers, and details thereof are not repeated.

A main difference there between is that the embodiment of FIG. 2A to FIG. 2D describes the number and the configuration pattern of the selection lines 150 when the number of the first signal lines 110 is smaller than or equal to the number of the second signal lines 120, and the present embodiment describes the number and configuration pattern of the selection lines 150 when the number of the first signal lines 110 is greater than the number of the second signal lines 120.

In detail, when the number of the first signal lines 110 is greater than the number of the second signal lines 120, the number of the selection lines 150 is designed to be twice of the number of the second signal lines 120. In the present embodiment, the selection lines 150 are located at two opposite sides of each of the pixel regions P, and two selection lines 150 are disposed between two neighbouring second signal lines 120. Moreover, the two selection lines 150 disposed between the two neighbouring second signal lines 120 are further located between two adjacent pixel electrodes 140.

As shown in FIG. 3A, the number of the first signal lines 110 is 18, and the number of the second signal lines 120 is 12. Since the number of the first signal lines 110 is greater than the number of the second signal lines 120, the number of the selection lines 150 is twice of the number of the second signal lines 120. In other words, the number of the selection lines 150 is 24. Moreover, since the maximum common divisor (N) of the number of the first signal lines 110 and the number of the selection lines 150 is 6, and the amount ratio between the first signal lines 110 and the selection lines 150 is ¾, the selection lines 150 are divided into 6 groups G1, G2, G3, G4, G5 and G6, and each group has three first selection lines 152 electrically connected to the first signal lines 110 and one second selection line 154 not electrically connected to the first signal line 110.

It should be noticed that in the embodiments of FIG. 2A and FIG. 3A, the selection lines 150 are all divided into 6 groups G1, G2, G3, G4, G5 and G6, and each group only includes one second selection line 154, though the invention is not limited thereto. The number of the groups and the number of the second selection lines 154 in each group can be different according to different resolutions of the electronic apparatus. For example, when the pixel array is applied to an electronic apparatus with a resolution of 720*480 (i.e. the number of the first signal lines 110 is 720, and the number of the second signal lines 120 is 480), the number of the selection lines 150 is 960, the amount ratio a1/a2 between the numbers of the first signal lines 110 and the selection lines 150 is ¾, and the maximum common divisor (N) thereof is 240, so that the selection lines 150 are divided into 240 groups.

Figure 4A:
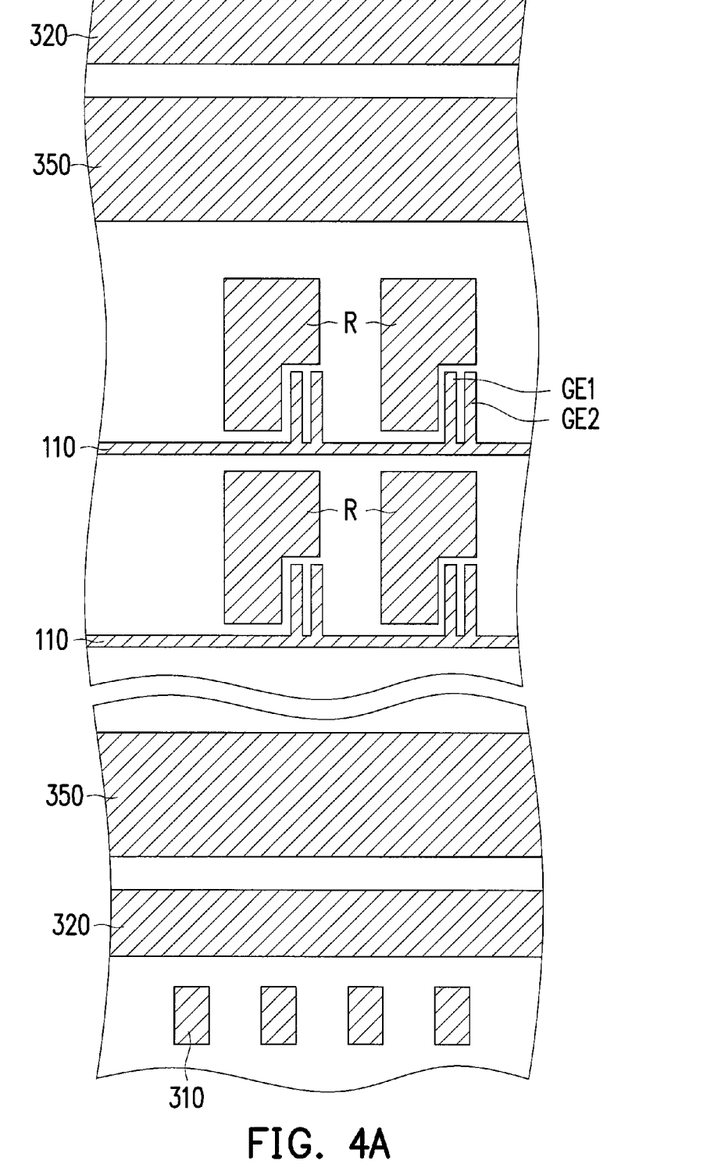
FIG. 4A to FIG. 4C are partial top views of a fabrication process of a pixel array according to a third embodiment of the invention.
Figure 4B:
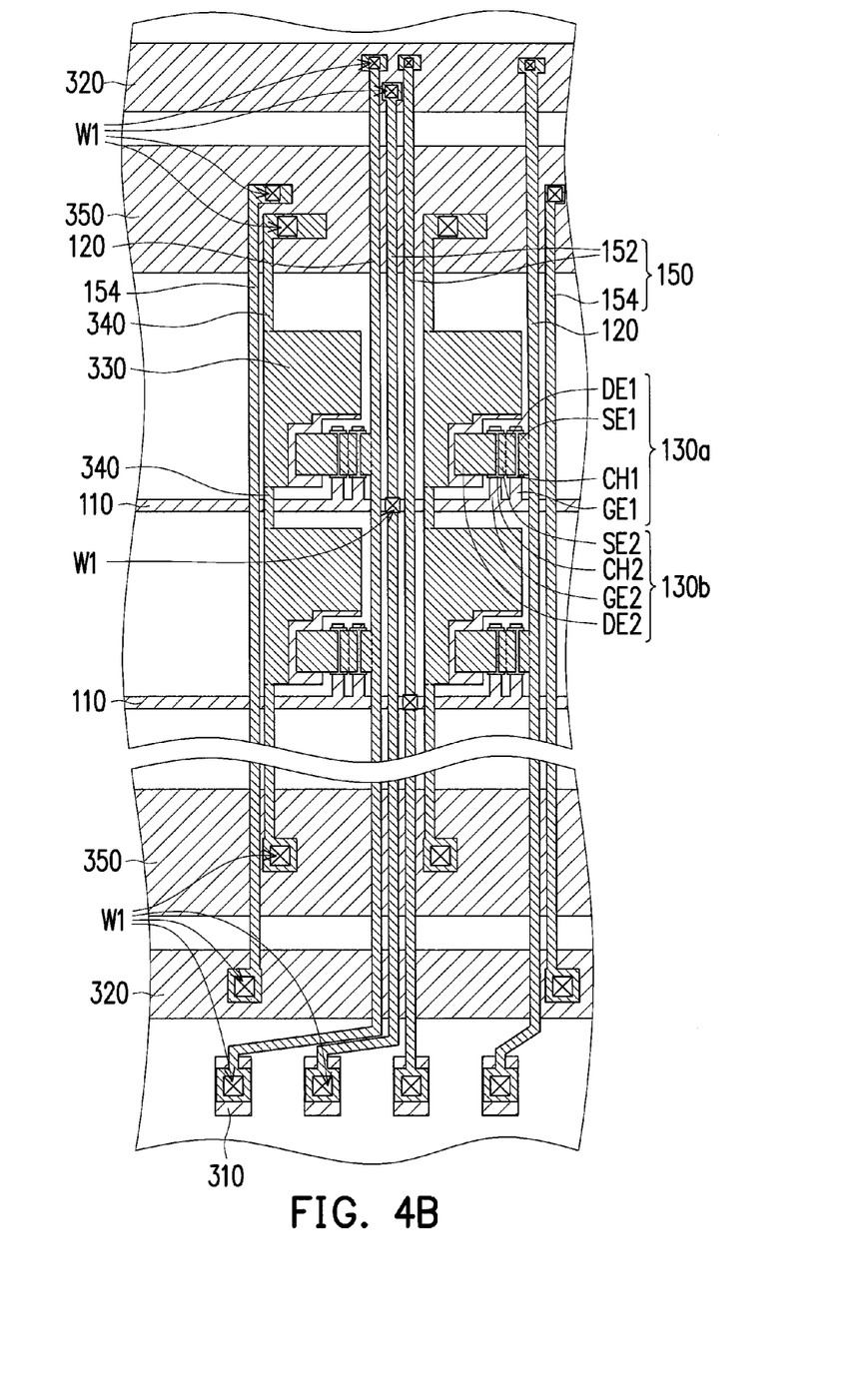
Figure 4C:
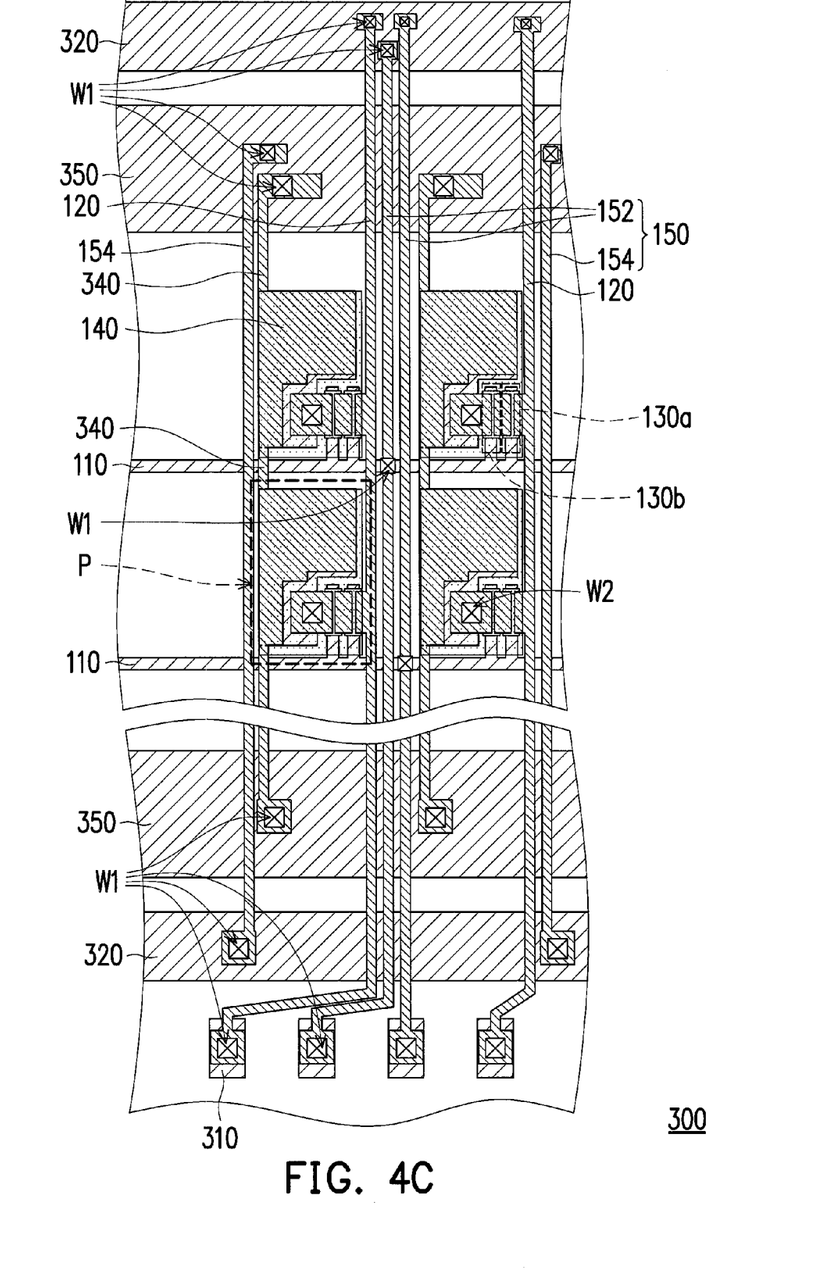

FIG. 4A to FIG. 4C are partial top views of a fabrication process of a pixel array according to a third embodiment of the invention. Referring to FIG. 4A to FIG. 4C, the pixel array 300 of the present embodiment is substantially the same to the pixel array 200 of FIG. 3A and FIG. 3B, and the same components are denoted by the same referential numbers, and details thereof are not repeated.

A main difference there between is that each of the pixel regions P of the present embodiment is configured with a plurality of active devices (including active devices 130a and 130b), and the active devices 130a and 130b in each of the pixel regions P share a same first signal line 110 and a same second signal line 120. In detail as shown in FIG. 4B, a source SE1 of the active device 130a is connected to the second signal line 120, and a drain DE1 of the active device 130a is connected to a source SE2 of the active device 130b.

Moreover, the pixel array 300 of the present embodiment further includes a plurality of pads 310 and a ground electrode 320. The pads 310 are located at one side of the pixel regions P. The ground electrode 320 is located to at least one side of the pixel regions P to, for example, serve as a protection for electrostatic discharge (ESD). In the present embodiment, the ground electrode 320 is, for example, disposed around all of the pixel regions P (where the ground electrode 320 at two sides of the pixel regions P is omitted), and the selection lines 150 (i.e. the first selection lines 152) electrically connected to the first signal lines 110 are respectively connected between the ground electrode 320 and one of the pads 310, and the selection lines 150 (i.e. the second selection lines 154) not electrically connected to the first signal lines 110 are respectively connected to the ground electrode 320.

Moreover, the pixel array 300 further includes a plurality of first common electrodes 330, a plurality of common electrode connection lines 340 and at least one second common electrode 350. The first common electrodes 330 are electrically insulated to the pixel electrodes 140, and are disposed corresponding to the pixel electrodes 140 to construct storage capacitors. The common electrode connection lines 340 connect the first common electrodes 330 in series along a direction D. In the present embodiment, the direction D is the first direction D1, though the invention is not limited thereto. The second common electrode 350 is located to at least one side of the pixel regions P, and the first common electrodes 330 are electrically connected to the second common electrode 350 through the common electrode connection lines 340. Moreover, the selection lines 150 (i.e. the second selection lines 154) not electrically connected to the first signal lines 110 are respectively connected between the second common electrode 350 and the ground electrode 320.

When the pixel array 300 is applied to a reflective display apparatus, the pixel array 300 may further include reflective electrodes R. As shown in FIG. 4A, the reflective electrodes R, the first signal line 110, the gates GE1 and GE2 of the active devices 140a, 140b, the pads 310, the ground electrode 320 and the second common electrode 350 can be formed by patterning a first metal layer. As shown in FIG. 4B, after the gate insulation layer GI (shown in FIG. 2C) and the channel layers CH1 and CH2 are formed, the sources SE1 and SE2 and the drains DE1 and DE2 of the active devices 140a and 140b, the second signal lines 120, the selection lines 150, the first common electrodes 330, the common electrode connection lines 340 can be formed by patterning a second metal layer, where the second signal lines 120 are respectively connected to the ground electrode 320 and the pads 310 through the openings W1 of the gate insulation layer GI, the first selection lines 152 are respectively connected to the first signal lines 110, the ground electrode 320 and the pads 310 through the openings W1, and the second selection lines 154 are respectively connected to the ground electrode 320 and the second common electrode 350 through the openings W1, and the common electrode connection lines 340 are electrically connected to the second common electrode 350 through the openings W1. Since the first common electrodes 330 and the common electrode connection lines 340 are configured in a same layer with the second signal lines 120, the common electrode connection lines 340 connect the adjacent first common electrodes 330 in series along an extending direction (i.e. the first direction D1) of each of the second signal lines 120. In another embodiment, when the first common electrodes 330 and the common electrode connection lines 340 are configured in a same layer with the first signal lines 110, the common electrode connection lines 340, for example, connect the adjacent first common electrodes 330 in series along an extending direction (i.e. the second direction D2) of each of the first signal lines 110. As shown in FIG. 4C, after the insulation layer OG (shown in FIG. 2C) is formed, the pixel electrodes 140 are electrically connected to the drains DE2 (shown in FIG. 4B) through the openings W2 of the insulation layer OG.

In the embodiment of FIG. 4A to FIG. 4C, the other components such as the pads 310, the ground electrode 320, the first common electrodes 330, the common electrode connection lines 340, the second common electrode 350 and the reflective electrodes R are further configured under a structure that the number of the selection line 150 is twice of the number of the second signal lines 120, though the invention is not limited thereto. Under the structure that the number of the selection lines 150 is equal to the number of the second signal lines 120 (shown in FIG. 2A and FIG. 2B), the aforementioned components can also be added to the pixel array.

In summary, in the pixel array of the invention, the first selection lines electrically connected to the first signal lines and the second selection lines not electrically connected to the first signal lines are dispersedly disposed in the pixel array to decrease obviousness of gray level difference between different regions, so that display quality is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A pixel array, comprising:
a plurality of first signal lines;
a plurality of second signal lines, electrically insulated to the first signal lines, and intersected with the first signal lines to define a plurality of pixel regions;
a plurality of active devices, located in the pixel regions, and each of the active devices being electrically connected to the corresponding first signal line and the second signal line;
a plurality of pixel electrodes, disposed corresponding to the pixel regions, and electrically connected to the active devices; and a plurality of selection lines, electrically insulated to the second signal lines and intersected with the first signal lines, and at least one selection line being disposed between the two neighbouring second signal lines, wherein an amount ratio of the first signal lines and the selection lines is a1/a2, where a1 ≤a2, and when a1 and a2 are mutually prime numbers, the selection lines are divided into a plurality of groups, each group comprises a1 selection lines electrically connected to the first signal lines, and (a2-a1) selection lines not electrically connected to the first signal lines,
wherein each group comprises a plurality of first selection lines electrically connected to the first signal lines and at least one second selection line not electrically connected to the first signal lines, the number of the at least one second selection lines is plural, and an arranging sequence of the first selection lines and the at least one second selection line of each group is the same.

2. The pixel array as claimed in claim 1, wherein in each of the groups, the at least one second selection line is located at one side of the first selection lines.

3. The pixel array as claimed in claim 1, wherein in each of the groups, the at least one second selection line is located between the first selection lines.

4. The pixel array as claimed in claim 1, wherein at least a part of the second selection lines are dispersedly disposed between the first selection lines.

5. The pixel array as claimed in claim 1, wherein when the number of the first signal lines is smaller than or equal to the number of the second signal lines, the number of the selection lines is equal to the number of the second signal lines, and the second signal lines and the selection lines are arranged in alternation along an extending direction of each of the first signal lines.

6. The pixel array as claimed in claim 1, wherein when the number of the first signal lines is greater than the number of the second signal lines, the number of the selection lines is twice of the number of the second signal lines.

7. The pixel array as claimed in claim 6, wherein the selection lines are located at two opposite sides of each of the pixel regions, and two selection lines are disposed between two neighbouring second signal lines.

8. The pixel array as claimed in claim 7, wherein the two selection lines disposed between the two neighbouring second signal lines are further located between two neighbouring pixel electrodes.

9. The pixel array as claimed in claim 1, wherein the selection lines and the pixel electrodes are not overlapped with each other.

10. The pixel array as claimed in claim 1, wherein the selection lines and the second signal lines are located in a same layer, and the selection lines and the first signal lines are located in different layers.

11. The pixel array as claimed in claim 1, further comprising:
a plurality of pads, located at one side of the pixel regions; and
a ground electrode, located to at least one side of the pixel regions, and the selection lines electrically connected to the first signal lines being respectively connected between the ground electrode and one of the pads, and the selection lines not electrically connected to the first signal lines being respectively connected to the ground electrode.

12. The pixel array as claimed in claim 11, further comprising:

a plurality of first common electrodes, electrically insulated to the pixel electrodes, and disposed corresponding to the pixel electrodes;

a plurality of common electrode connection lines, connecting the first common electrodes in series along a direction; and at least one second common electrode, located to at least one side of the pixel regions, and the first common electrodes being electrically connected to the second common electrode through the common electrode connection lines, and the selection lines not electrically connected to the first signal lines being respectively connected between the second common electrode and the ground electrode.

* * * * *